(12) United States Patent
Gutzmer et al.

(10) Patent No.: US 9,052,184 B2
(45) Date of Patent: Jun. 9, 2015

(54) APPARATUS FOR POSITION ASCERTAINMENT

(75) Inventors: Marcus Gutzmer, Garbsen (DE); Uwe Nolte, Barsinghausen (DE); Guido Sonntag, Gehrden (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 160 days.

(21) Appl. No.: 13/991,074

(22) PCT Filed: Nov. 24, 2011

(86) PCT No.: PCT/EP2011/070972
§ 371 (c)(1),
(2), (4) Date: May 31, 2013

(87) PCT Pub. No.: WO2012/072498
PCT Pub. Date: Jun. 7, 2012

(65) Prior Publication Data
US 2013/0257418 A1 Oct. 3, 2013

(30) Foreign Application Priority Data

Dec. 2, 2010 (DE) .......... 10 2010 062 316

(51) Int. Cl.
*G01B 7/14* (2006.01)
*G01B 7/30* (2006.01)
(Continued)

(52) U.S. Cl.
CPC .............. *G01B 7/30* (2013.01); *B66B 13/143* (2013.01); *E05F 15/142* (2013.01);
(Continued)

(58) Field of Classification Search
CPC .............. B66B 13/143; E05Y 2400/32; E05Y 2400/616; E05Y 2900/104
USPC .................. 324/51, 55, 200, 207.11, 207.22; 318/400.01, 452, 689; 49/349, 506; 73/488, 516
See application file for complete search history.

(56) References Cited

U.S. PATENT DOCUMENTS 5,397,975 A 3/1995 Syverson
5,672,926 A 9/1997 Brandes et al.
(Continued)

FOREIGN PATENT DOCUMENTS

CN 101247062 A 8/2008
DE 69420743 T2 5/2000
(Continued)

OTHER PUBLICATIONS
International Search Report for PCT/EP2011/070972; mailed Nov. 14, 2012.
(Continued)

*Primary Examiner* — Jermele M Hollington
*Assistant Examiner* — Raul Rios Russo
(74) *Attorney, Agent, or Firm* — Staas & Halsey LLP

(57) ABSTRACT

The position of a moveable component which is coupled to an electric machine is ascertained, where the electric machine serves, in the event of manual movement of the component, as a generator for generating electric energy for a position ascertainment arrangement. The coupling of the electric machine with the component is configured such that a magnetic attraction reaction and/or repelling reaction between magnetic and/or magnetized parts of a rotor and of a stator of the electric machine results in a short-term acceleration of the rotor, which is unhindered by the coupling, and in a resulting short-term increase of the electric energy generated.

8 Claims, 1 Drawing Sheet

(51) Int. Cl.
  *B66B 13/14* (2006.01)
  *H02K 11/00* (2006.01)
  *H02P 9/00* (2006.01)
  *G01D 5/20* (2006.01)
  *G01R 33/00* (2006.01)
  *E05F 15/14* (2006.01)

(52) U.S. Cl.
  CPC ....... *E05Y 2400/32* (2013.01); *E05Y 2400/616* (2013.01); *H02K 11/0031* (2013.01); *H02P 9/009* (2013.01); *G01D 5/2033* (2013.01); *E05Y 2900/104* (2013.01)

(56) References Cited

U.S. PATENT DOCUMENTS

| | | | |
|---|---|---|---|
| 2001/0017242 A1 | | 8/2001 | Tajima et al. |
| 2003/0052564 A1 | * | 3/2003 | Wilsdorf ............... 310/179 |
| 2006/0220484 A1 | * | 10/2006 | Stephens ............ 310/156.43 |
| 2006/0244271 A1 | | 11/2006 | Hass |
| 2007/0090713 A1 | | 4/2007 | Arita et al. |
| 2007/0216240 A1 | | 9/2007 | Kikuchi et al. |
| 2008/0047200 A1 | | 2/2008 | Krause et al. |
| 2008/0129129 A1 | | 6/2008 | Kori et al. |
| 2009/0265992 A1 | | 10/2009 | Hass et al. |
| 2010/0045222 A1 | | 2/2010 | Rozman et al. |
| 2010/0090561 A1 | | 4/2010 | Leroy et al. |
| 2010/0115853 A1 | | 5/2010 | Gebhart et al. |
| 2010/0242368 A1 | | 9/2010 | Yulkowski |
| 2011/0260564 A1 | * | 10/2011 | Rodger et al. ............. 310/83 |

FOREIGN PATENT DOCUMENTS

| | | |
|---|---|---|
| DE | 10 2005 047 178 A1 | 4/2007 |
| DE | 102006040232 A1 | 3/2008 |
| DE | 102008041605 A1 | 3/2010 |
| EP | 0 658 745 A2 | 6/1995 |
| EP | 1 770 001 A2 | 4/2007 |
| FR | 1453957 | 8/1966 |
| JP | 2003-261281 | 9/2003 |
| KR | 10-0218409 | 6/1999 |
| WO | 2009/079685 A1 | 7/2009 |

OTHER PUBLICATIONS

Office Action issued Jun. 18, 2014 in corresponding German Patent Application No. 102010062316.4.

"New technology yields encoder that never forgets", Motion Control, The Journal of Controlled Mechanical Power in South Africa, Technews Publishing Ltd., 2007, 4 pp.

"Rotary encoder", Wikipedia, printed Jun. 17, 2014 from en.wikipedia.org/w/index.php?title=Rotary_encoder, pp. 1-8.

"Inkrementalgeber", Wikipedia, printed Jun. 17, 2014 from de.wikipedia.org/w/index.php?title=Inkrementalgeber, pp. 1-5.

* cited by examiner

APPARATUS FOR POSITION ASCERTAINMENT

CROSS REFERENCE TO RELATED APPLICATIONS

This application is the U.S. national stage of International Application No. PCT/EP2011/070972, filed Nov. 24, 2011 and claims the benefit thereof. The International Application claims the benefit of German Application No. 102010062316.4 filed on Dec. 2, 2010, both applications are incorporated by reference herein in their entirety.

BACKGROUND

Described below are an apparatus for position ascertainment and a method for position ascertainment.

A magnetic flow-regulated brushless permanent magnet motor is known from the related art, as described in US 2010/0045222 A1. The motor has a stator with an internal bore. A permanent magnet motor is arranged in the internal bore. A direct current passes through a control excitation winding so as to regulate the magnetic flow. A low alternating current likewise flows through the control excitation winding and a signal resulting therefrom is ascertained so as to ascertain a position of the permanent magnet rotor.

SUMMARY

In an apparatus for position ascertainment of a moveable component coupled to an electrical machine, the electrical machine is used, in the event of a manual movement of the component, as a generator for generating electrical energy for a position ascertainment arrangement, wherein the coupling of the electrical machine to the component is embodied such that a magnetic attraction reaction and/or repelling reaction between magnetic and/or magnetized parts of a rotor and of a stator of the electrical machine result in a short-term acceleration of the rotor, which is unhindered by the coupling, and in a resulting short-term increase in the electrical energy generated.

The apparatus can be used for instance for position ascertainment of a moveable component, which is embodied as a door of a lift, in particular as a cabin door of a lift cabin.

The magnetic attraction reaction results from a magnetic north pole of the rotor approaching a magnetic south pole of the stator and/or from a magnetic south pole of the rotor approaching a magnetic north pole of the stator during the rotational movements of the rotor. On account of the attraction reaction, a higher torque acts in the short-term on the rotor than caused by an external force on account of the manual movement of the moveable part, as a result of which an acceleration of the rotor to almost complete approximation of the respective opposite magnetic pole and as a result an increase in the generated electrical energy takes place. The magnetic repelling reaction and the acceleration of the rotor resulting therefrom, which results in an increase in the electrical energy generated by the electrical machine, results from a repelling of the magnetic north pole of the rotor from the magnetic north pole of the stator and/or the magnetic south pole of the rotor from the magnetic south pole of the stator after moving past the magnetic north pole or south pole of the stator and a short-term increase in the torque acting on the rotor which results therefrom.

With a very slow manual movement of the component, sufficient electrical energy can also be generated in this way at least in the short-term for the position ascertainment arrangement, as a result of which a precise position ascertainment of the moveable component is ensured at any time. This is hugely important in the case of the cabin door of the lift cabin for instance if a regular electrical power supply across a power supply network fails and a manual opening of the cabin door required as a result for releasing people from the lift cabin also stops.

With a failure of the regular electrical power supply of this type, the opening of the cabin door and the position of the opened cabin door can be detected and stored by the apparatus, so that with a re-established regular electrical power supply, the cabin door is immediately closed again at normal speed and also reopened. A very time-consuming previous initialization movement of the cabin door, for instance a complete opening and/or closing of the cabin door with a very slow movement speed, known from the related art so as to re-ascertain a completely open and completely closed position of the cabin door and in this way re-enable the position ascertainment, is not necessary, as a result of which a significant time saving is achieved. I.e. the lift is once again ready for operation much more quickly with a re-established regular electrical power supply.

By counting the short-term increases in the electrical energy generated by the electrical machine as a type of increment count, the position ascertainment of the moveable component is also simultaneously possible since the number of increases in the generated electrical energy corresponds to a number of revolutions of the rotor of the electrical machine and as a result to the movement of the component, which is coupled to the electrical machine by way of a rotor axis. An additional incremental sensor is then not required, as a result of which no additional electrical energy is required for its operation. The electrical energy generated by the apparatus for position ascertainment and storing the ascertained position is therefore sufficient. Furthermore, costs can be saved and installation space reduced. The position ascertainment is further largely wear-free since it does not take place mechanically.

With an adequate electrical power supply, the electrical machine is expediently used as a drive motor for moving the component, i.e. for instance in the case of the cabin door the electrical machine in an intact regular electrical power supply is used as a drive motor for opening and closing the cabin door of the lift cabin. Only if the regular electrical power supply fails is the electrical machine used, with a manual movement of the component, as a generator, so as to ensure in this way the adequate electrical power supply for the position ascertainment arrangement. No additional generator is in this way required for this function, but instead the otherwise required electrical machine can be used as a generator. Alternatively, an additional drive motor is however also possible for the moveable component.

The stator and/or the rotor may include at least one permanent magnet. The effect of the short-term acceleration of the rotor on account of the magnetic attraction reaction and/or repelling reaction between magnetic and/or magnetized parts of the rotor and the stator of the electrical machine is basically also possible, if both the rotor and also the stator are embodied as electromagnets, since a magnetic remanence of iron cores of the electrical magnets may already be adequate herefor. The effect is nevertheless improved and even ensured again with a longer time span since the last operation if the stator and/or the rotor include at least one permanent magnet. In an advantageous embodiment, the stator is therefore embodied as a permanent magnet stator and at least one permanent magnet is arranged on the rotor at right angles to the rotor axle. In a further advantageous embodiment, the rotor is embodied as a permanent magnet rotor and at least one permanent magnet is arranged on the stator.

The apparatus expediently includes at least one storage unit for storing the ascertained position of the component. This can be operated for storage purposes by the electrical energy generated by the electrical machine in generator mode, but should however advantageously also be preserved for storage without an electrical power supply. The storage unit is for instance embodied as a so-called EEPROM, in particular as a so-called Flash EEPROM or as a hard disk.

The position ascertainment arrangement advantageously includes an incremental sensor, for instance an optical incremental sensor. This can be used for instance in normal mode for position ascertainment, i.e. in the case of the cabin door of the lift cabin with an intact, regular electrical power supply. An incremental sensor of this type can also be supplied with electrical energy if the regular electrical power supply fails and the manual movement of the component stops and can as a result be operated for positioning ascertainment purposes. Nevertheless, in such an instance, as already described, it is possible to ascertain the position of the moveable component through the number of increases in electrical energy generated by the electrical machine, which correspond to the number of revolutions of the rotor, which is coupled to the moveable component by way of the rotor axle.

In the method for ascertaining the position of a moveable component coupled to an electrical machine using the apparatus described herein, with a manual movement of the component by the electrical machine operating as a generator, electrical energy is generated for a position ascertainment arrangement and a position of the component is ascertained by the position ascertainment arrangement, wherein a rotor of the electrical machine is accelerated in the short-term, unhindered by the coupling, by a magnetic attraction reaction and/or repelling reaction between magnetic and/or magnetized parts of the rotor and a stator of the electrical machine and the generation of electrical energy is as a result increased in the short-term.

The method can be used for instance to ascertain the position of a moveable component, which is embodied as a door of a lift, in particular as a cabin door of a lift cabin.

The magnetic attraction reaction results from a magnetic north pole of the rotor approaching a magnetic south pole of the stator and/or from a magnetic south pole of the rotor approaching a magnetic north pole of the stator during rotational movements of the rotor. On account of the attraction reaction, in addition to a torque acting on the rotor on account of an external force by the manual movement of the component, an additional torque acts on the rotor, as a result of which the rotor is accelerated until complete approximation of the respective opposite magnetic pole. As a result, higher electrical power is generated by the electrical machine. The magnetic repelling reaction and the additional torque acting on the rotor, which results in a short-term acceleration of the rotor, results from a repelling of the magnetic north pole of the rotor from the magnetic north pole of the stator and/or the magnetic south pole of the rotor from the magnetic south pole of the stator after moving past the magnetic north pole or south pole of the stator, as a result of which higher electrical energy is likewise generated by the electrical machine.

In this way, with a very slow manual movement of the component, adequate electrical energy is at least generated in the short-term for the position ascertainment arrangement, and as a result a precise position ascertainment of the moveable component is ensured at any time. This is of huge importance in terms of the cabin door of a lift cabin for instance if a regular electrical power supply via a power supply network and a manual opening of the cabin door required as a result to release people from the lift cabin stops.

In the method described herein, with a failure of this type of the regular electrical power supply, the opening of the cabin door and the position of the opened cabin door is also detected and stored so that with a re-established regular electrical power supply, the cabin door can be immediately closed again at normal speed and also re-opened. A very time-consuming preceding initialization movement of the cabin door, for instance a complete opening and/or closing of the cabin door with a very slow movement speed which is known from the related art, in order to re-ascertain a completely opened and completely closed position of the cabin door and in this way to enable again the position ascertainment, is not required, as a result of which a significant time saving is achieved. I.e. the lift is essentially more quickly fit for service as a result of a re-established regular electrical power supply.

The position of the component may be ascertained by ascertaining a number of the short-term increases in the generated electrical energy and/or by an incremental sensor of the position ascertainment arrangement. The position ascertainment of the moveable component is possible by counting the short-term increases in the electrical energy generated by the electrical machine as a type of increment count, since the number of increases in the electrical energy generated corresponds to a number of revolutions of the rotor of the electrical machine and as a result to the movement of the component, which is coupled to the electrical machine by way of a rotor axle. An additional incremental sensor is then not required, as a result of which no additional electrical energy is required for its operation. The electrical energy generated in this way is therefore sufficient for position ascertainment and for storing the ascertained position.

Nevertheless, alternatively or in addition, an incremental sensor, for instance an optical incremental sensor, can also be used, which is employed for instance during normal mode with a regular electrical power supply for position ascertainment purposes, i.e. in the case of the cabin door of the lift cabin with an intact, regular electrical power supply by a power supply network. An incremental sensor of this type can then be supplied with sufficient electrical energy by the electrical power supply of the electrical machine in generator mode even if the regular electrical power supply fails and the manual movement of the component stops and thereby continue to be used for position ascertainment purposes.

The ascertained position is expediently stored in a storage unit. This is operated for storage purposes by the electrical energy generated by the electrical machine in generator mode, but should nevertheless advantageously also preserve storage without an electrical power supply. The storage unit is for instance embodied as a so-called EEPROM, in particular as a so-called Flash-EEPROM or as a hard disk.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
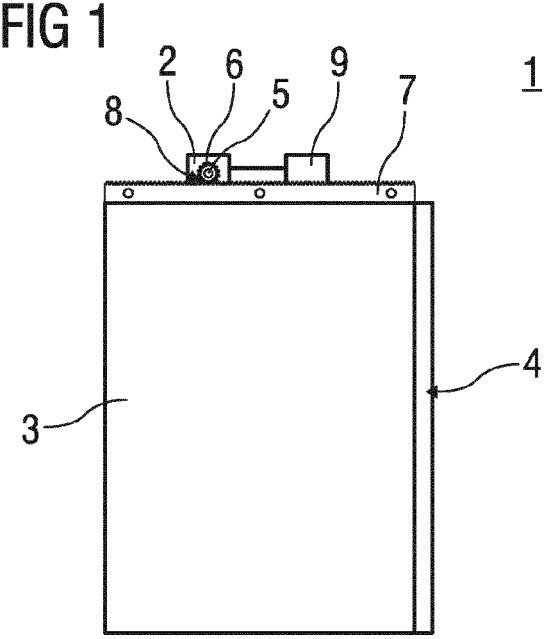
FIG. 1 is a schematic diagram of a lift cabin and a cabin door coupled to an electrical machine.

Parts which correspond to one another are provided with the same reference characters throughout the figures.

FIG. 1 shows an example of a lift or elevator with an apparatus 1 for position ascertainment of a moveable component 3 coupled to an electrical machine 2, by which a method for ascertaining the position of the moveable component 3 coupled to the electrical machine 2 can be implemented. In the exemplary embodiment shown here, the moveable component 3 coupled to the electrical machine 2 is a door of the lift, in more precise terms a cabin door of a lift cabin 4. The lift cabin 4 is arranged in a lift shaft (not shown here), in which it moves between floors of a building (not shown).

With a regular electrical power supply via a power supply network, the electrical machine 2 is used as a drive motor for moving the component 3, in the example shown here, for opening and closing the cabin door. To this end, the electrical machine 2 is coupled to the component 3 embodied as a cabin door by way of a transmission, for instance by way of a gear wheel 6 arranged on a rotor axle 5 of the electrical machine 2 and a toothed rod 7 connected to the component 3 embodied as a cabin door. In other exemplary embodiments, a coupling 8 of the electrical machine 2 of this type to the moveable component 3 can also take place by way of a toothed belt for instance.

A respective position of the moveable component 3 embodied as a cabin door can be established by a position ascertainment arrangement, thereby ensuring that the lift cabin 4 is only moved if the cabin door is closed. To this end, an incremental sensor (not shown in more detail), for instance an optical incremental sensor, is arranged for instance on the electrical machine 2, in the region of the coupling 8 or on the cabin door.

If the regular electrical power supply fails, a manual movement of the component 3 is possible, i.e. a manual opening or closing of the cabin door for instance by a technician, so as to release people in the lift cabin 4. On account of failure of the regular electrical power supply, known incremental sensors nevertheless no longer function in this case for position ascertainment purposes, so that a change in position by the manual movement of the component 3 embodied as a cabin door cannot be detected.

With lifts according to the related art, a very time-consuming initialization movement of the cabin door is therefore needed with a re-established regular electrical power supply, for instance a complete opening and/or closing of the cabin door with a very slow movement speed, so as to re-ascertain a completely open and completely closed position of the cabin door and in this way to re-enable position ascertainment of the cabin door by the incremental sensor.

It is therefore particularly advantageous, even if the regular electrical power supply fails and a manual movement of the component 3 embodied as a cabin door stops, to enable a position ascertainment at any time and to store the last ascertained position in a storage unit 9. With a re-established regular electrical power supply, the cabin door is in this way immediately to be closed again at normal speed and re-opened so that the previous initialization movement of the cabin door is no longer required. A significant time saving is achieved in this way, since the lift is essentially quickly fit for service again with a re-established regular electrical power supply.

This position ascertainment is enabled by the apparatus 1 and the method for position ascertainment. With a manual movement of the component 3 embodied as a cabin door, the electrical machine 2 is in this way used as a generator to generate electrical energy for the position ascertainment arrangement.

Figure 2:
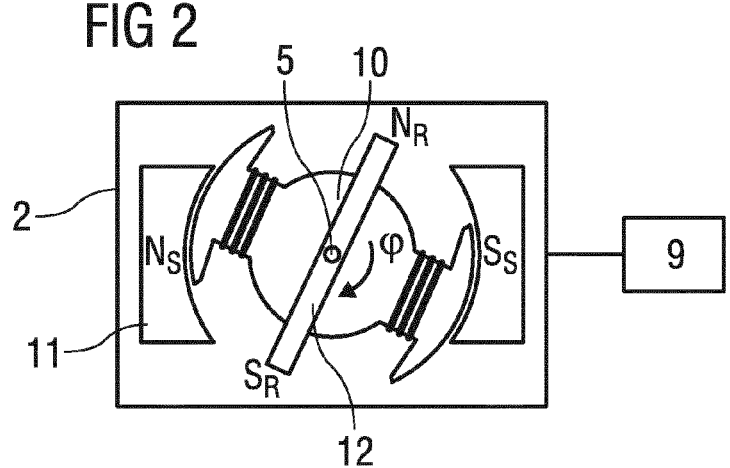
FIG. 2 is a schematic diagram of an electrical machine.

To this end, it is necessary for the coupling 8 of the electrical machine 2 to be embodied with the component 3 such that a magnetic attraction reaction and/or repelling reaction between magnetic and/or magnetized parts of a rotor 10 shown in more detail in FIG. 2 and stator 11 of the electrical machine 2 results in a short-term acceleration of the rotor 10, which is unhindered by the coupling 8, and a short-term increase in the generated electrical energy which results therefrom. I.e. the coupling 9 of the electrical machine 2 with the moveable component 3 embodied as a cabin door must be embodied sufficiently loose and/or have an adequate elasticity so as to enable adequate freewheeling for the rotor 10.

Figure 3:
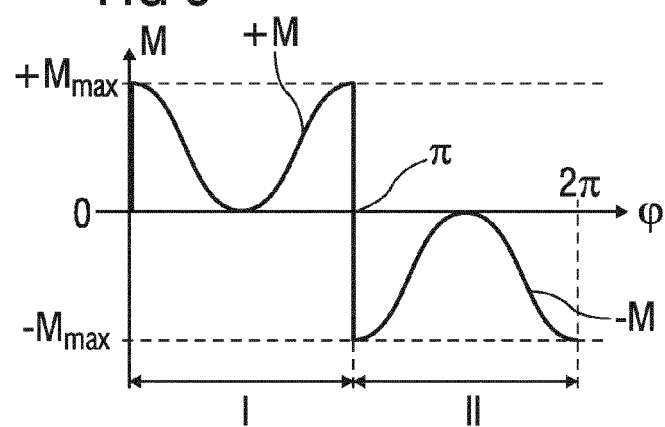
FIG. 3 is a graph of an additional torque acting on a rotor of an electrical machine.

In order to enable this short-term acceleration of the rotor 10, at least one permanent magnet 12 is arranged at right angles to the rotor axle 5, in this exemplary embodiment, as shown in FIG. 2, the rotor axle having a magnetic rotor north pole $N_R$ and a magnetic rotor south pole $S_R$. The stator 11 is embodied as a permanent magnet stator and includes a magnetic stator north pole $N_S$ and a magnetic stator south pole $S_S$. With a manual movement of the component 3 embodied as a cabin door, a course of an additional torque M acting on the stator 11 on account of the magnetic attraction reaction and/or repelling reaction, shown schematically by way of example in FIG. 3, is produced in this way as a function of a rotary angle $\Phi$ of the rotor 10.

A plurality of permanent magnets 12 of this type arranged on the rotor 10 are naturally also possible in the further embodiments, which are aligned twisted in respect of one another. Furthermore, other electrical machines 2 are also possible, which include a rotor 10 embodied as a permanent magnet rotor and additional permanent magnets 12 arranged on the stator 11. Furthermore, the method can also be implemented without permanent magnets 12, since a magnetic remanence of cores of an electromagnetic stator and/or electromagnetic rotor can already also be sufficient.

Without this magnetic attraction reaction and/or repelling reaction between the magnetic and/or magnetized parts of the rotor 10 and the stator 11 of the electrical machine 2, i.e. between the magnetic poles $N_R$, $S_R$, $N_S$, $S_S$ of the permanent magnet 12 and stator 11 arranged on the rotor 10, a constant torque (not shown here) would act on the rotor 10 on account of a force acting constantly on the component 3, which leads to manual movement of the component 3 and which also acts on the rotor axle 5 of the electrical machine 2 and via this on the rotor 10 by way of the component 3 and the coupling 8 to the electrical machine 2. There is nevertheless the risk here of the external force being too small and the movement of the component 3 being too small so as to effect an adequately rapid revolution of the rotor 10 so that adequate electrical energy can not be generated for operation of the position ascertainment arrangement.

On account of the magnetic attraction reaction and/or repelling reaction between the magnetic poles $N_R$, $S_R$, $N_S$, $S_S$ of the permanent magnet 12 arranged on the rotor 10 or the stator 11 of the electrical machine 2 and the additional torque M generated in the short-term respectively, the rotor 10 is nevertheless adequately accelerated in the short-term so that the increase in electrical energy generated resulting therefrom is sufficient for the position ascertainment arrangement.

For instance, with a rotary angle $\Phi$ of the rotor 10 of zero, identical magnetic poles $N_S$, $S_S$, $N_R$, $S_R$ of the stator 11 and of the permanent magnet 12 arranged on the rotor 10, i.e. the magnetic north pole $N_S$, $N_R$ and the magnetic south poles $S_S$, $S_R$ of the stator 11 and of the permanent magnet 12 arranged on the rotor 10 are firstly at the smallest possible distance from one another. In this position, the additional torque M generated by the magnetic attraction reaction and/or repelling reaction is equal to zero.

If the rotor 10 is then rotated clockwise for instance by the external force acting on the component 3 and the movement of the component 3 resulting therefrom for instance, the additional torque M increases on account of the magnetic repelling reaction of the same magnetic poles $N_S$, $S_S$, $N_R$, $S_R$ of the stator 11 and of the permanent magnet 12 arranged on the rotor 10 immediately to a positive maximum value $+M_{max}$, drops with a further rotation of the rotor 10 on account of an increasing distance of the same magnetic poles $N_S$, $S_S$, $N_R$, $S_R$ of the stator 11 and of the permanent magnets 12 arranged on the rotor 10 to a rotary angle $\Phi$ of $\pi/2$ or 90° against zero and then increases on account of opposite magnetic poles $N_S$, $S_S$, $N_R$, $S_R$ of the stator 11 approaching permanent magnets 12 arranged on the rotor 10, which mutually attract one another, to a rotary angle $\Phi$ of $\pi$ or 180° once again to the positive maximum value $+M_{max}$.

It is in this way dependent on the magnetic field strengths of the stator 11 and of the permanent magnet 12 arranged on the rotor 10 and on a distance of the poles $N_S$, $S_S$ of the stator 11 relative to the poles $N_R$, $S_R$ of the permanent magnet 12 arranged on the rotor 10, as to whether the additional torque M drops close to zero with a rotary angle $\Phi$ of $\pi/2$ or 90°, as shown schematically by way of example in FIG. 3, or as to whether it drops less before it increases again in the direction of the rotary angle $\Phi$ of $\pi$ or 180°. In the rotary angle range between zero and $\pi$, i.e. between zero and 180°, the additional torque M acts as a positive additional torque +M with the external force in the clockwise direction and as a result in the direction of rotation caused by the external force on the rotor 10, as shown schematically in FIG. 3 in a first area I of the diagram.

On account of the looseness and elasticity in the coupling 8 between the component 3 and the electrical machine 2 and the freewheeling of the rotor 10 resulting therefrom, the rotor 10 is accelerated in the short-term by this additional torque M acting as a positive addition torque +M. An increase in the electrical energy generated by the electrical machine 2, which is used for electrical power supply of the position ascertainment arrangement, results from the quicker rotary movement of the rotor 10, so as to ascertain the position of the component 3 and to store the same in the storage unit 9. The additional torque M embodied as a positive coupling additional torque +M is generated in this first area I until the opposite magnetic poles $N_S$, $S_S$, $N_R$, $S_R$ of the stator 11 and of the permanent magnet 12 arranged on the rotor 10 have approximated as much as possible, i.e. with a rotary angle $\Phi$ of $\pi$ or 180°.

On account of the magnetic attraction forces of different magnetic poles $N_S$, $S_S$, $N_R$, $S_R$ of the stator 11 and of the permanent magnet 12 arranged on the rotor 10, the rotor 10 endeavors to remain in this position with a rotary angle $\Phi$ of $\pi$ or 180°, so that the additional torque M drops immediately to zero. The rotor 10 is however rotated in the clockwise direction again by the force acting on the rotor 10 by way of the movement of the component 3. An immediate negative increase in the additional torque M acting on the rotor 10 to a negative maximum value $-M_{max}$ then results on account of the magnetic attraction of opposite magnetic poles $N_S$, $S_S$, $N_R$, $S_R$ of the stator 11 and of the permanent magnet 12 arranged on the rotor 10. The additional torque M embodied now as a negative additional torque $-M$ now acts counter to the clockwise direction and as a result counter to the external force. I.e. it now acts in the opposite direction of rotation.

With a further rotation of the rotor 10, on account of an increasing distance from opposite magnetic poles $N_S$, $S_S$, $N_R$, $S_R$ of the stator 11 and of the permanent magnet 12 arranged on the rotor 10, the negative additional torque $-M$ drops to zero at a rotary angle $\Phi$ of $3\pi/4$ or 270° and then increases to a rotary angle $\Phi$ of $2\pi$ or 360° again negatively to the negative maximum value $-M_{max}$ on account of a the same magnetic poles approaching poles $N_S$, $S_S$, $N_R$, $S_R$ of the stator 11 and the permanent magnet 12 arranged on the rotor 10, which mutually repel one another. It is in this way also dependent on the magnetic field strengths of the stator 11 and of the permanent magnet 12 arranged on the rotor 10 and on the distance of the pole $N_S$, $S_S$ of the stator 11 to the poles $N_R$, $S_R$, of the permanent magnet 12 arranged on the rotor 10, as to whether the additional torque M embodied as a negative additional toque $-M$ drops negative close to zero with a rotary angle $\Phi$ of $3\pi/4$ or 270°, as shown schematically by way of example in FIG. 3, or as to whether it drops less negatively before it increases negatively again in the direction of the rotary angle of $\Phi$ of $2\pi$ or 360°. In the rotary angle range between $\pi$ and $2\pi$, i.e. between 180° and 360°, the additional torque M acts as a negative additional torque $-M$ in a counter-coupling manner, i.e. counter to the external force and counter to the clockwise direction and as a result counter to the direction of rotation caused by the external force on the rotor 10, as shown schematically in FIG. 3 in a second region II of the diagram.

The rotor 10 now endeavors to rotate counterclockwise on account of the additional torque M embodied as the negative additional torque $-M$. If the additional torque M now acting counter to the external force is sufficiently large and the looseness and elasticity in the coupling 8 is sufficiently large, a short-term acceleration of the rotor 10 results therefrom counter to the clockwise direction, i.e. in a direction of rotation, which is opposite to the direction of rotation caused by the manual movement of the component 3, so that this short-term acceleration of the rotor 10 can also be used to increase the electrical energy generation.

The position ascertainment of the component 3 can also be implemented by counting the periodic increases in the generated electrical energy, which correspond to the revolution counts of the rotor 10 coupled to the component 3 by way of the rotor axle 5 and therefore also to the movement of the component 3. A good count is possible in this way on account of an alternating polarity of the increases in the electrical energy generated. An additional incremental sensor is then not necessary, as a result of which no additional electrical energy is required for its operation. The electrical energy generated in this way is therefore sufficient for position ascertainment purposes and storage of the ascertained position.

The ascertained position is stored in the storage unit 9, wherein the storage unit 9 may also be able to preserve energy stored without an electrical power supply. For instance, the storage unit 9 is embodied as a so-called EEPROM, in particular as a so-called Flash EPPROM or as a hard disk. The last ascertained position of the moveable component 3 is also then stored in this way if the component 3 is no longer moved manually and no electrical energy is therefore generated and if the regular electrical power supply is still not re-established.

Cost can be saved and installation space reduced by ascertaining the position by way of the count of increases in the generated electrical energy as a type of incremental count, since no additional incremental sensor is needed. The position ascertainment is also largely wear-free, since it does not take place mechanically.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. An apparatus, receiving an adequate electrical power supply, for ascertaining a position of a moveable component, comprising:
    an electrical machine having a rotor axle, and a rotor and a stator with magnetic and/or magnetized parts coupled to the moveable component via the rotor axle, the electrical machine performing as a drive motor moving the moveable component and as a generator generating electrical energy in a position ascertainment during manual movement of the moveable component, the electrical machine being coupled with the moveable component such that at least one of a magnetic attraction reaction and a repelling reaction between the magnetic and/or magnetized parts of the rotor and the stator of the electrical machine result in a short-term acceleration of the rotor unhindered by coupling with the moveable component and a short-term increase in generated electrical energy resulting therefrom, so that by counting periodic increases in the generated electrical energy, corresponding to a number of revolutions of the rotor, the position ascertainment of the moveable component can be implemented.

2. The apparatus as claimed in claim 1, wherein at least one of the stator and the rotor includes at least one permanent magnet.

3. The apparatus as claimed in claim 2, wherein the stator is a permanent magnet stator and at least one permanent magnet is arranged on the rotor at right angles to the rotor axle.

4. The apparatus as claimed in claim 2, wherein the rotor is a permanent magnet rotor and at least one permanent magnet is arranged on the stator.

5. The apparatus as claimed in claim 4, further comprising at least one storage unit storing the ascertained position of the component.

6. The apparatus as claimed in claim 5, further comprising an incremental sensor in a position ascertainment arrangement.

7. A method for ascertaining a position of a moveable component coupled to an electrical machine having a rotor and a stator, comprising:
    generating electrical energy for a position ascertainment arrangement by manual movement of the component causing movement of the electrical machine operating as a generator; and
    ascertaining a position of the component by the position ascertainment arrangement, based on a short-term acceleration of the rotor of the electrical machine due to at least one of a magnetic attraction reaction and a repelling reaction between magnetic and/or magnetized parts of the rotor and the stator of the electrical machine, unhindered by coupling to the moveable component, as a result increasing the electrical energy generated in the short-term acceleration of the rotor, so that the position of the component is ascertained based on a number of short-term increases in the electrical energy generated.

8. The method as claimed in claim 7, further comprising storing the position ascertained in a storage unit.

\* \* \* \* \*